United States Patent
Jenkins et al.

(10) Patent No.: US 8,055,219 B2
(45) Date of Patent: Nov. 8, 2011

(54) FREQUENCY AGILE ANTENNA SYSTEM AND METHOD

(75) Inventors: Jeremy E. Jenkins, Bartlett, IL (US); Dilip Patel, Bartlett, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 638 days.

(21) Appl. No.: 11/969,652

(22) Filed: Jan. 4, 2008

(65) Prior Publication Data

US 2009/0176465 A1 Jul. 9, 2009

(51) Int. Cl.
*H04B 1/04* (2006.01)

(52) U.S. Cl. ..... 455/121; 455/193.1; 455/84; 343/700 MS; 343/745; 343/749

(58) Field of Classification Search ............... 455/121, 455/193.1, 84; 343/700 MS, 745, 749
See application file for complete search history.

(56) References Cited

U.S. PATENT DOCUMENTS

| | | | |
|---|---|---|---|
| 7,671,804 B2 * | 3/2010 | Zhang et al. | 343/700 MS |
| 2004/0113842 A1 * | 6/2004 | du Toit et al. | 343/700 MS |
| 2005/0057399 A1 * | 3/2005 | Kipnis et al. | 343/700 MS |
| 2009/0046030 A1 * | 2/2009 | Song et al. | 343/852 |

* cited by examiner

*Primary Examiner* — Sanh Phu
(74) *Attorney, Agent, or Firm* — Fitch Even Tabin & Flannery (57) ABSTRACT

A first value of an operational center frequency of a signal to transmit is determined according to received user input. The operational center frequency is centered within a first band of frequencies and the first band of frequencies has a first bandwidth. A single loop antenna is tuned to match the first value of the center frequency and the single loop antenna is arranged and configured to operate across a second band of frequencies having a second bandwidth. The first bandwidth is less than the second bandwidth. The signal is transmitted from the single loop antenna according to the first value of the operational center frequency to provide a transmitted signal.

18 Claims, 4 Drawing Sheets

FREQUENCY AGILE ANTENNA SYSTEM AND METHOD

FIELD OF THE INVENTION

The field of the invention relates to antenna systems and, more specifically, to frequency agile antenna systems that are used to transmit and receive communications.

BACKGROUND

Different types of moveable barrier operators have been sold over the years and these barrier operator systems have been used to actuate various types of moveable barriers. For example, garage door operators have been used to move garage doors and gate operators have been used to open and close gates.

Such barrier movement operators may include various mechanisms to facilitate this opening and closing of the barrier. For instance, a wall control unit may be coupled to the barrier movement operator and send signals to a head unit thereby causing the head unit to open and close the barrier. In addition, operators often include a receiver unit at the head unit to receive wireless transmissions from a hand-held code transmitter or from a keypad transmitter, which may be affixed to the outside of the area barred by the barrier or other structure.

In previous barrier operator systems, a transmitter (either portable or positioned at a fixed location) was used to actuate a moveable barrier operator and thereby move the barrier. Some of these transmitters functioned as universal transmitters in that they had the ability to transmit signals at several different frequencies. Generally, these previous universal transmitters used multiple tuned circuits to produce the different frequencies. Some of these previous universal transmitters also utilized mechanical switches in order to switch between the different transmitter circuits. Others of these previous systems used a single tuned circuit to produce the desired frequencies.

Unfortunately, all of the above-mentioned previous universal transmitter systems suffered from problems. For instance, the multi-circuit transmitters were usually expensive to produce because of the need for and use of multiple transmitter circuits. Additionally, previous single-tuned circuits were not very efficient in operation since they were typically low Q-value circuits and, consequently, could not efficiently cover the entire spectrum of frequencies needed by the transmitter, especially when the transmitter was a small, low-power, handheld transmitter. Other previous systems utilized a bulky metal loop antenna, which added undesirable bulk and weight to the transmitter.

SUMMARY

Universal transmitters are provided for use in moveable barrier operators systems. The approaches provided herein provide a transmitter sending transmissions that can be made across an adequately wide frequency range, for example, across the 300-434 MHz frequency spectrum used in many moveable barrier operator systems utilize a single, tuned circuit that provides adequate Q-values. Additionally, the transmitters that utilize these approaches are small, light weight, low power, portable, and can be powered by a conventional battery.

In many of these embodiments, a first value of an operational center frequency of a signal to transmit is determined according to received user input. The operational center frequency is centered within a first band of frequencies and the first band of frequencies has a first bandwidth. A single loop antenna is tuned to match the first value of the operational center frequency and the single loop antenna operates across a second band of frequencies having a second bandwidth. In many of these examples, the first bandwidth is less than the second bandwidth.

The signal is transmitted from the single loop antenna according to the first value of the operational center frequency and received, in one example, at a moveable barrier operator. The first value of the operational center frequency may thereafter be changed to be a second value and this second value, in many of these approaches, falls within the second band of frequencies.

The tuning of the antenna can be accomplished utilizing a variety of different approaches. In one example, the tuning of the antenna is accomplished using a lookup table. In another example, the power of the transmitted signal is measured and the tuning is accomplished according to the measured power. In still another example, dampening of the transmitted signal is determined and the antenna is tuned according to the dampening. Other examples of tuning are possible and can be made according to other factors or other combinations of factors.

In many of these approaches, the Q-value of the system is of an adequately high value. Consequently, the transmissions from the antenna can be made across an entire spectrum of frequencies while still maintaining the small size of the transmitter. To take one example, in many of these approaches, the Q-value is greater than approximately 10. Other circuit configurations having other Q-values may be provided.

As mentioned, transmissions can be made at various center frequencies and across a wide variety of bandwidth ranges according to the present approaches. In one example, the first bandwidth of transmitted signal is less than approximately 1 Mhz and the second bandwidth is approximately 10 Mhz. Other examples of center frequencies and bandwidths ranges for the transmitted signal are possible.

In others of these embodiments, a transmitter includes a controller, a synthesizer, single loop antenna, and tuner. The controller determines the operational center frequency from the received user input. The synthesizer is configured and arranged to form a signal to transmit according to received user input. The operational center frequency is centered within a first band of frequencies and the first band of frequencies has a first bandwidth. The single loop antenna operates across a second band of frequencies having a second bandwidth and the first bandwidth is less than the second bandwidth. The tuner is coupled to the single loop antenna, the synthesizer, and the controller. The tuner is configured and arranged to tune the single loop antenna to the value of the resonant center frequency as determined by the synthesizer and as directed by the controller.

The tuner may include various elements. In one example, the tuner includes a varactor. In some of these approaches, a voltage is applied to the varactor to change the value of the resonant center frequency of the antenna.

The antenna may be structured or formed in a variety of different ways using different materials. For instance, in some examples, the antenna is a printed circuit board (PCB) antenna (e.g., a trace element). Other examples of antenna structures or configurations may also be used.

Thus, universal transmitters are provided that can be used to actuate moveable barrier operators. The approaches provided herein utilize a single, tuned circuit having adequate Q-values so that narrow-band transmissions can be made across an entire usable frequency spectrum, for example, across the 300-434 MHz spectrum. In so doing, universal transmitters are provided that are small, light weight, low-power, portable, and can be powered using conventional batteries or other types of conventional energy storage arrangements.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

It will be appreciated that the approaches described herein are particularly useful and applicable to transmitters used in conjunction with moveable barrier operator systems. However, it will be appreciated that these approaches can be applied to transmitters that are used in other types of systems and are not limited to use with only moveable barrier operator systems.

Figure 1:
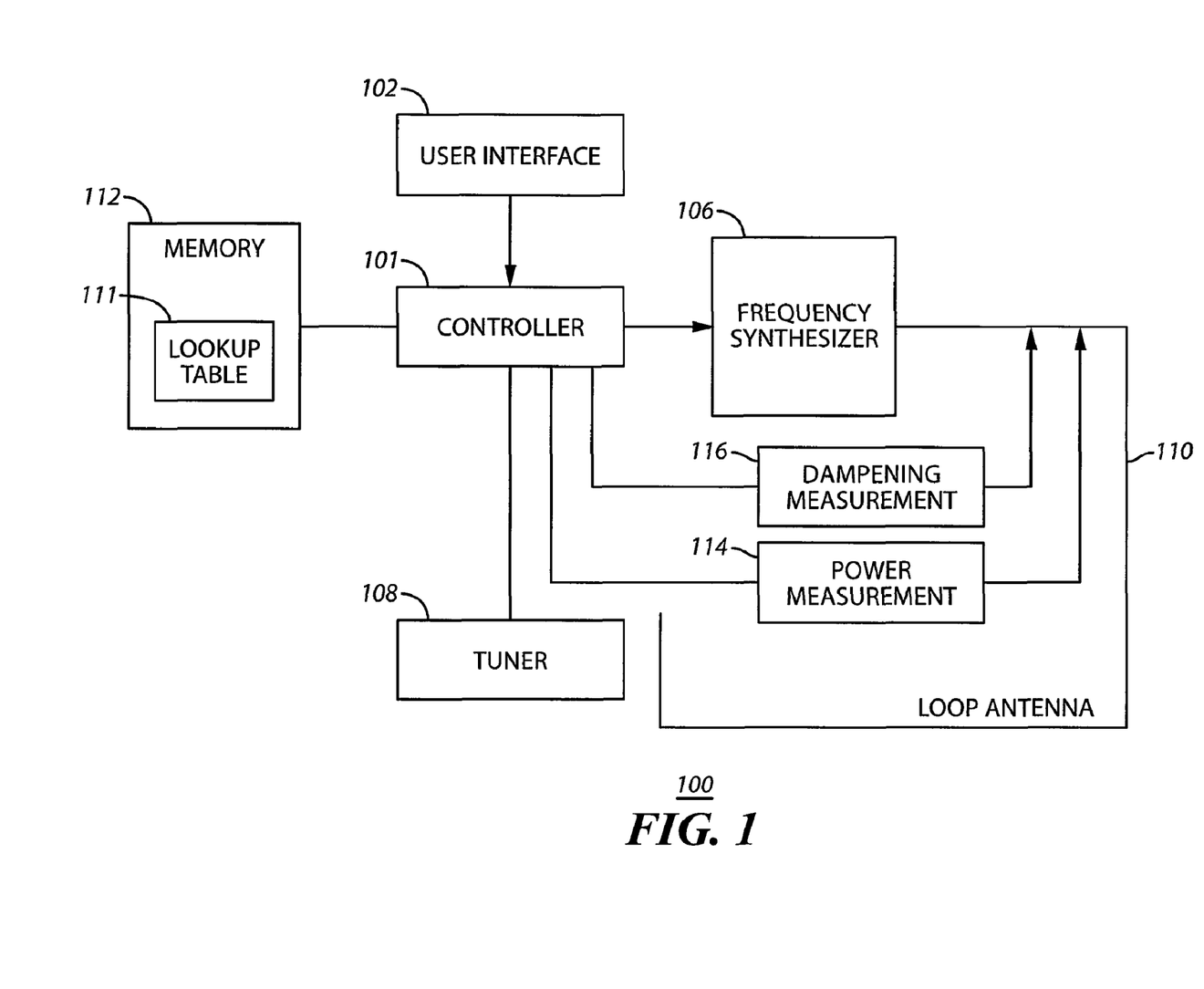
FIG. 1 comprises a block diagram of a universal transmitter according to various embodiments the present invention.

Referring now to FIG. 1, one example of a universal transmitter that utilizes the present approaches is described. In this example, a transmitter 100 includes a controller or processor 101 (coupled to a memory 112), a frequency synthesizer 106, a single loop antenna 110, and a tuner 108. A user interface 102 accepts input from a user that indicates a desired frequency to tune the single loop antenna 110. The controller 101 directs the operation of the tuner 108 and frequency synthesizer 106 to tune the single loop antenna 110 to the appropriate desired frequency indicated by instructions received from the user via the user interface 102 and to transmit signals from the single loop antenna 110.

Various approaches can be used to tune the single loop antenna 110. As described below, a power measurement circuit 114, a dampening measurement circuit 116, and/or a lookup table 111 (stored in the memory 112) may be used to tune the single loop antenna 110. It will be understood that other elements, circuit components, or data structures may also be used to tune or assist in tuning the single loop antenna 110.

As mentioned, the synthesizer 106 forms signals to be transmitted at the desired operational center frequency via the antenna 110. In this regard, the operational center frequency is centered within a first band of frequencies and this first band of frequencies has a first bandwidth. To give one example, the first bandwidth may be less than approximately 5 MHz.

The single loop antenna 110 is structured to operate across a second band of frequencies that have a second bandwidth, and, in many of these approaches, the first bandwidth is less than the second bandwidth. In one example, the second bandwidth of ranges is from approximately 300 MHz to approximately 434 MHz.

The user interface 102 is any type of actuator or combination of actuators that is used to receive user input indicating a desired frequency to transmit signals from the transmitter 100. For example, the user interface 102 may be one or more switches, dials, levers, or buttons. In some examples, a separate actuator may be used to indicate each potential desired frequency and the corresponding actuator is actuated by a user to transmit at that frequency. In other examples, a single actuator is used for transmissions at all frequencies.

The single loop antenna 110 can also assume a number of forms and structures. In some examples, the single loop antenna 110 is structured as a printed circuit board (PCB) antenna (e.g., a trace element). Other examples of antenna structures or configurations may also be used.

The tuner 108 tunes the single loop antenna 110 to the value of the resonant center frequency. The tuner 108 may include various electronic circuit elements arranged in a variety of different ways. In one example, the tuner 108 includes a varactor. In some approaches when a varactor is used, the voltage applied to the varactor changes the value of the resonant center frequency of the single loop antenna 110.

As mentioned, the memory 112 may include a lookup table 111 and this may be used by the controller 101 to apply signals to the tuner 108 and thereby tune the single loop antenna 110. In another example, the power of the transmitted signal is measured by the power measurement circuit 114, the controller 101 analyzes the received information, and the tuning is accomplished according to the measured power. In still another example, dampening of the transmitted signal is determined by the dampening measurement circuit 116, the controller 101 analyzes the received information, and the single loop antenna 110 is tuned according to the dampening. Other examples of tuning arrangements and procedures are possible.

In one example of the operation of the system of FIG. 1, information is received at the user interface 102 indicating a value of a center frequency of a signal to transmit. The controller 101 analyzes the signal and operates the synthesizer 106 and tuner 108 to transmit information at the indicated center frequency.

The single loop antenna 110 is tuned by the tuner 108 to match a desired value of the center frequency. The signal is transmitted from the single loop antenna 110 according to the value of the operational center frequency. The value of the operational center frequency may be changed to be another value and this other value, in many of these approaches, is within the second band of frequencies.

The signals sent from the single loop antenna 110 (and formed by the synthesizer 106) themselves may include various types of information such as codes that are used to actuate a moveable barrier operator or some other device. For example, these codes may be fixed codes, rolling codes, or some combination of fixed and rolling codes.

In many of these approaches, the Q-value provided by the single loop antenna 110 is of an adequately high value. More specifically, the Q-value is of such a value so as to allow for the transmission of narrow band signals (e.g., 5 MHz) from the single loop antenna 110 across a wide frequency range (e.g., 300-434 MHz). Moreover, these signals are transmitted with sufficient power so as to be easily detected by a moveable barrier operator. To take one example, the Q-value of the transmission circuit is greater than approximately 10. Other examples of Q-values and other circuits providing differing Q-values are possible. Also, other circuit/antenna performance measurement factors can be used to determine the adequacy of the circuit so as to meet or exceed these criteria.

Figure 2A:
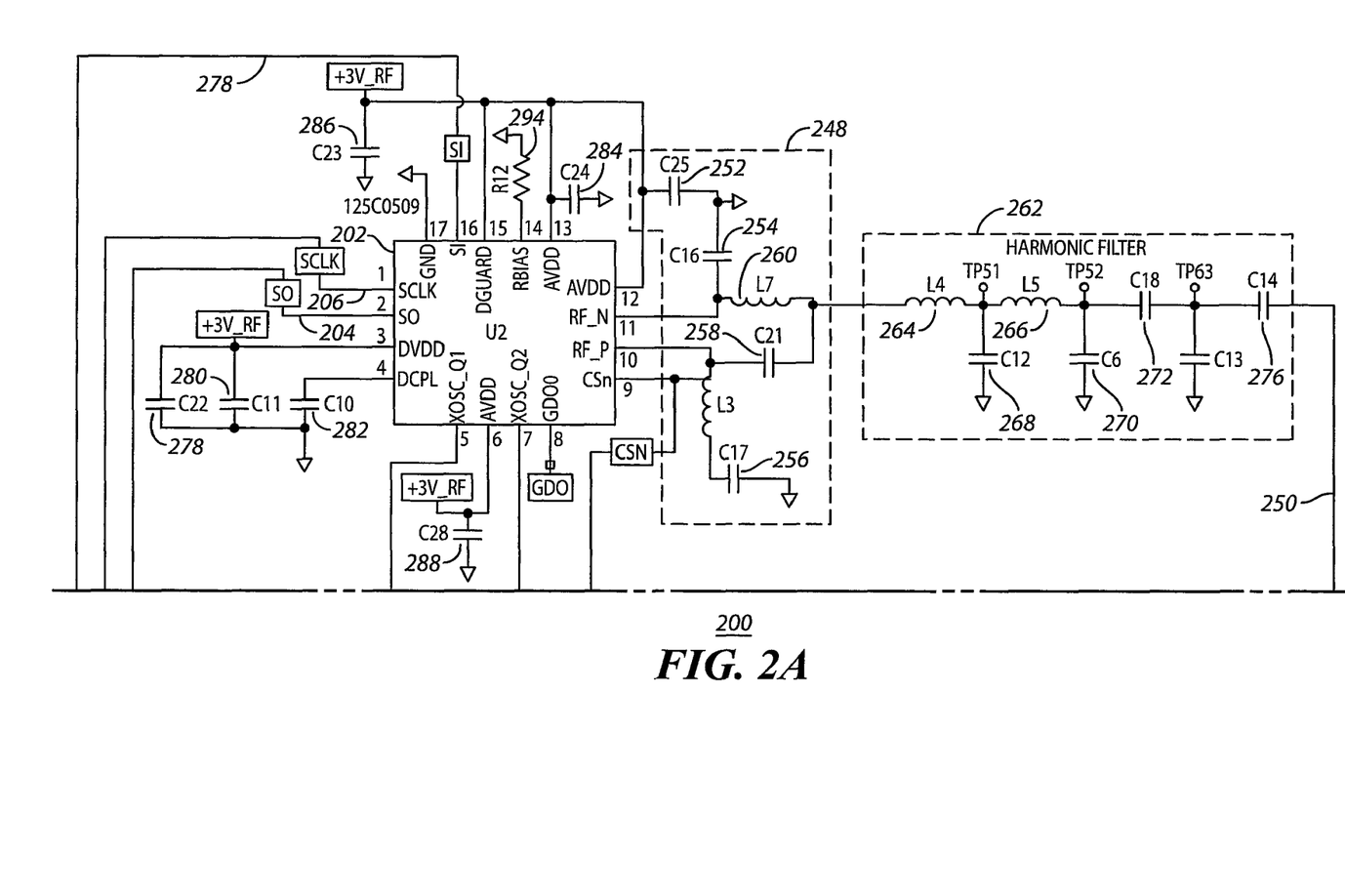
FIG. 2 comprises a circuit diagram of a universal transmitter according to various embodiments of the present invention.
Figure 2B:
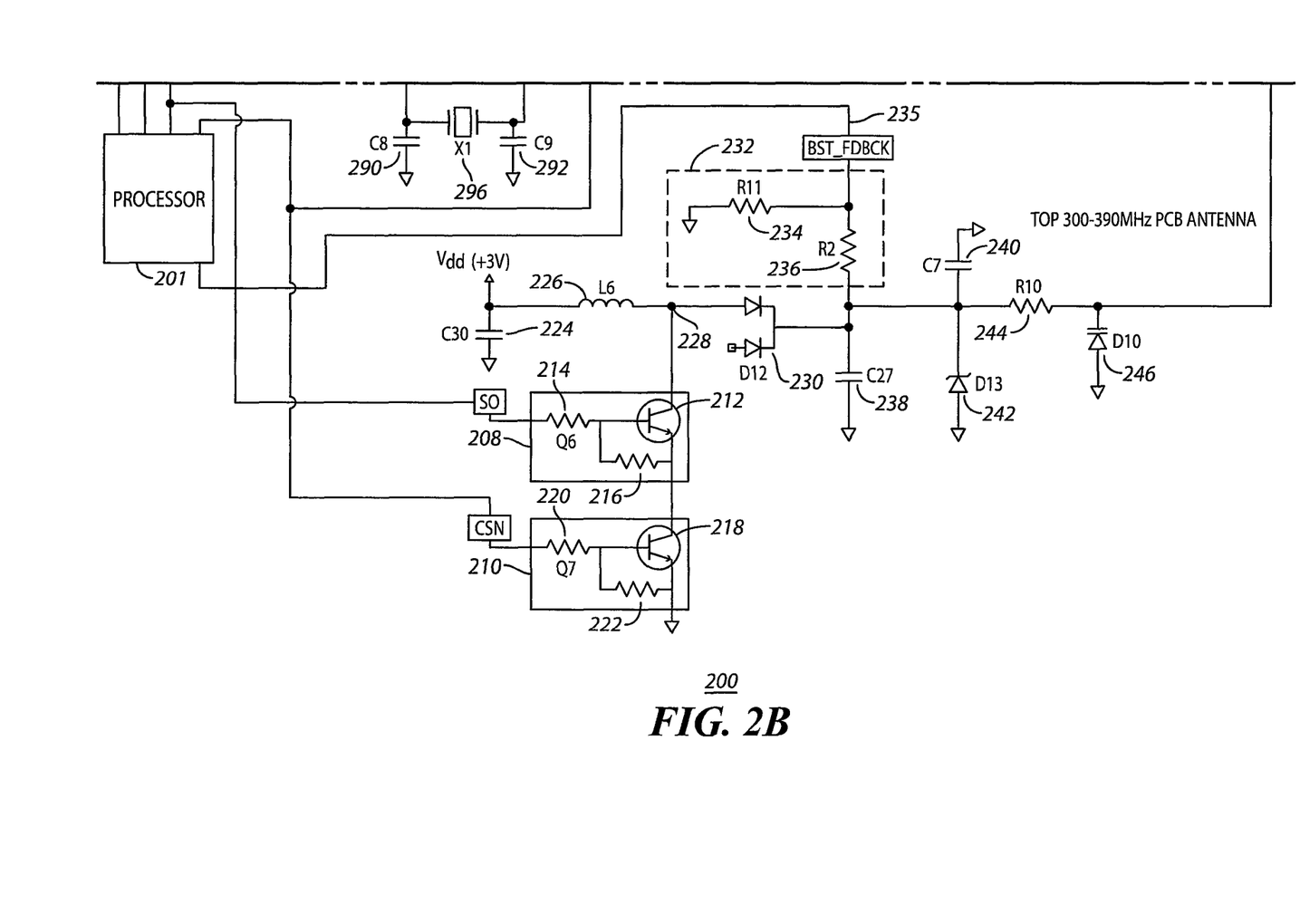

Referring now to FIG. 2, one example of a universal transmitter 200 is described. The transmitter of FIG. 2 includes electronic components with various values, ranges, and tolerances. It will be appreciated that these values, ranges, and tolerances are examples only and other components connected in different arrangements and having different values, ranges, and tolerances may also be used to achieve the same goals.

A synthesizer 202 receives a first signal 204 (also labeled as SO in FIG. 2) and a second signal 206 (also labeled as SCLK in FIG. 2) from a processor 201. These signals also drive a first switching circuit 208 and a second switching circuit 210. In one example, the synthesizer 202 may be a CC1152 device manufactured by Chipcon and the processor 201 may be a 16F689 manufactured by Microchip Technology, Inc. Other examples of synthesizers and processors are possible. The first signal 204 (SO) and second signal 206 (SCLK) are, respectively, low and high frequency clocked signals. The first signal 204 (SO) and the second signal 206 (SCLK) are digital serial communication busses and conduct communications at 100K baud.

The first switching circuit 208 and the second switching circuit 210 include various electronic components. More specifically, the first switching circuit 208 includes a first transistor 212 (also labeled as Q6 in FIG. 2), a first resistor 214 (e.g., a 10 k ohm resistor), and a second resistor 216 (e.g., a 47 k ohm resistor). The second switching circuit 210 includes a second transistor 218 (also labeled as Q7 is FIG. 2), a third resistor 220 (e.g., a 10 k ohm resistor), and a fourth resistor 222 (e.g., a 47 k ohm resistor).

A first capacitor 224 (C30, e.g., 1 micro farad) and first inductor 226 (L6, e.g., 470 micro henries) receive a voltage from the power supply Vdd (e.g., 3 volts) and operate to create a fly back voltage at a point 228 that is higher than Vdd. The generated voltage at point 228 is applied to diodes 230 (also labeled as D12 in FIG. 2) and is fed back (via the feedback line 235 also labeled as BST_FDBCK) to the processor 201 via resistor network 232. The resistor network 232 includes a resistor 234 (also labeled as R11 in FIG. 2, e.g., 49.9 k ohms) and a resistor 236 (also labeled as R2 in FIG. 2, e.g., 402 k ohms). The voltage also has noise removed by a second capacitor 238 (also labeled as C27 in FIG. 2, e.g., 4.7 microfarads) and a third capacitor 240 (also labeled as C7 in FIG. 2, e.g., 22 pico farads) and the voltage is limited by a voltage limiting diode 242 (also labeled as D13 in FIG. 2). A fifth resistor 244 (also labeled as R10 in FIG. 2, e.g., 100 k ohms) limits the current to the varactor 246 (also labeled as D10 in FIG. 2).

The synthesizer 202 is coupled to a matching network 248 that matches the impedance of an antenna 250 with the impedance at the output of the synthesizer 202. The matching network 248 includes a fourth capacitor 252 (also labeled as C25 in FIG. 2, e.g., 0.01 micro farads), a fifth capacitor 254 (also labeled as C16 in FIG. 2, e.g., 6.8 micro farads), a sixth capacitor 256 (also labeled as C17 in FIG. 2, e.g., 220 pico farads), and a seventh capacitor 258 (also labeled as C21 in FIG. 2, e.g., 6.8 pico farads). The matching network 248 also includes a second inductor 260 (also labeled as L7 in FIG. 2, e.g., 33 nano henries). The synthesizer 202 produces a modulated signal for transmission by the antenna 250. The signal may include various type of information, for example, various types of codes.

A harmonic filter 262 removes undesirable harmonics from the signal produced by the synthesizer 202. For instance, various lower range harmonics (e.g., the second and third harmonics) may be removed by the harmonic filter 262. In this example, the harmonic filter 262 includes a third inductor 264 (also labeled as L4 in FIG. 2, e.g., 18 nano henries), and a fourth inductor 266 (also labeled as L5 in FIG. 2, e.g., 33 nano henries). The harmonic filter 262 also includes an eighth capacitor 268 (also labeled as C12 in FIG. 2, e.g., 10 pico farads), a ninth capacitor 270 (also labeled as C6 in FIG. 2, e.g., 6.8 pico farads), a tenth capacitor 272 (also labeled as C18 in FIG. 2, e.g., 220 pico farads), an eleventh capacitor 274 (also labeled as C13 in FIG. 2, e.g., 33 pico farads), and a twelfth capacitor 276 (also labeled as C14 in FIG. 2, e.g., 15 pico farads).

The antenna 250 is coupled between the harmonic filter 262 and the varactor 246. The antenna 250 is a single loop antenna and, in one approach, is a trace element on a printed circuit board (PCB). Other elements or approaches may also be used to construct the antenna 250.

The synthesizer 202 receives information via a signal line 278 (labeled as SI in FIG. 2). Signal line 278 transmits information from the processor 201 indicating a desired frequency that the user wishes to tune the antenna 250. This information may itself be received by the processor 201 from one or more buttons, switches, or other types of actuators. Once the synthesizer 202 receives the information, it is processed and transmits first and second signals 204 and 206 to drive the circuits 208 and 210. This, in turn, increases the voltage in the inductor 226 (L6) and these signals are applied until voltage value on the feedback line 235 indicates to the processor 201 that the voltage at the varactor 246 has reached the needed level in order to tune the antenna 250 to the desired frequency. When the desired frequency is reached, the processor 201 halts transmission of the first and second signals 204 and 206. In this same manner, the processor 201 may resume application of the first and second signals 204 and 206 as the voltage across the varactor 246 drops in order to maintain the voltage across the varactor 246 at the desired level and maintain the tuning of the antenna 250.

The circuit of FIG. 2 also has other components configured to provide for proper operation of the synthesizer 202. These include a thirteenth capacitor 278 (also labeled as C22 in FIG. 2, e.g., 0.1 micro farads), fourteenth capacitor 280 (also labeled as C11 in FIG. 2, e.g., 220 micro farads), fifteenth capacitor 282 (also labeled as C10 in FIG. 2, e.g., 0.1 micro farads), sixteenth capacitor 284 (also labeled as C24 in FIG. 2, e.g., 220 pico farads), seventeenth capacitor 286 (also labeled as C23 in FIG. 2, e.g., 220 pico farads), eighteenth capacitor 288 (also labeled as C28 in FIG. 2, e.g., 0.01 micro farads), nineteenth capacitor 290 (also labeled as C8 in FIG. 2, e.g., 27 pico farads), twentieth capacitor 292 (also labeled as C9 in FIG. 2, e.g., 27 pico farads), resistor 294 (also labeled as R12 in FIG. 2, e.g., 56 k ohms), and oscillator 296. It will be understood that these components are provided here and connected as shown since the synthesizer 202 is a CC1152 device in this example. If other synthesizers are used, the supporting components, values of components, and connections used are likely to differ.

In one example of the operation of the circuit of FIG. 2, a user the changes the resonant center frequency of the antenna 250 via application of a control voltage to the varactor 246. More specifically, user input is received from a user interface at the processor 201. The processor 201 analyzes the signal and determines the desired resonant center frequency. The processor 201 then activates the signals 204 and 206 to drive the forward voltage across the varactor 246 to the level needed to produce the desired resonant center frequency at the antenna 250. The synthesizer 202 modulates a signal and applies the signal to the antenna 250 and the antenna 250 transmits the signal at the desired center frequency.

As mentioned, the antenna 250 is terminated by the varactor 246. The capacitance of the varactor 246 is controlled by a voltage across the varactor 246. In one example, the voltage applied to the varactor 246 can change from Vdd (in this example, 3 volts) to 18 volts. For instance, when the boost voltage across the varactor 246 is set to 3 volts, the resonant center frequency of the antenna 250 is set to be 300 MHz. On the other hand, when the boost voltage is set to 18 volts, the resonant center frequency of the antenna 250 is set to 434 MHz. The capacitance of the varactor 246 decreases and the resonant frequency increases as the forward voltage across the varactor 246 increases. The type and ratings of the varactor 246 are adjusted to control the minimum capacitance and, correspondingly, the maximum frequency that can be achieved by the antenna 250.

Figure 3:
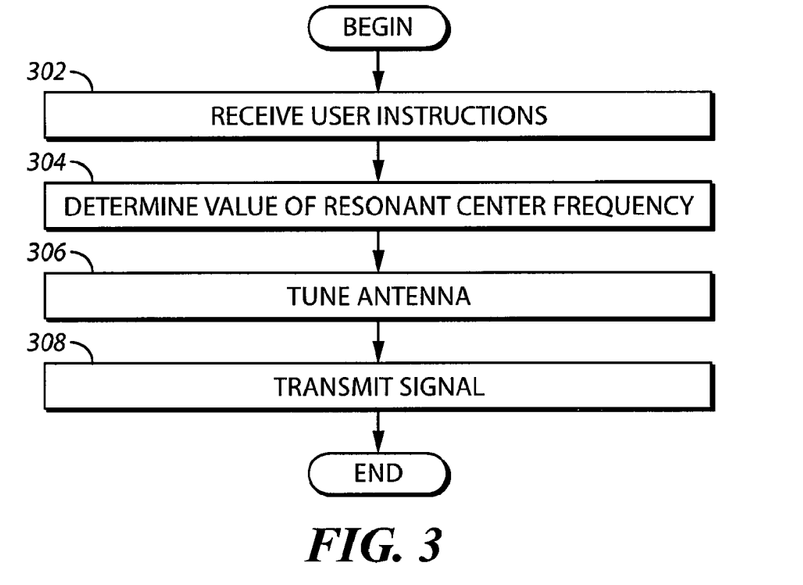
FIG. 3 comprises a flowchart of one approach for transmitting signals at multiple frequencies according to various embodiments of the present invention.

Referring now to FIG. 3, one example of an approach for generating multiple signals having different frequencies at a transmitter is described. At step 302, user instructions are received. These may be received at a user interface, for example, from actuators (e.g., switches, dials, levers, buttons, or the like) to indicate the desired frequency. In one example, a single actuator (e.g., button) is used for all frequencies. In another example, a different actuator (e.g., button) is used for each frequency.

At step 304 a value of a center frequency of a signal to transmit is determined according to received user input. The center frequency is centered within a first band of frequencies and the first band of frequencies has a first bandwidth.

At step 306, a single loop antenna is tuned to match the first value of the center frequency. This single loop antenna is arranged and configured to operate across a second band of frequencies having a second bandwidth and, in this example, the first bandwidth is less than the second bandwidth.

The tuning can be accomplished utilizing a variety of different approaches. In one example, the tuning is accomplished using a lookup table. In another example, the power of the transmitted signal is measured and the tuning is accomplished according to the power. In still another example, dampening of the transmitted signal is determined and the antenna is tuned according to the dampening. Other examples of tuning approaches are possible.

At step 308, the signal is transmitted from the single loop antenna according to the first value of the operational center frequency to provide a transmitted signal. Subsequent to step 308, the first value of the center frequency may be changed to be a second value and this second value is also within the second band of frequencies. To take one specific example, transmissions are made in the 300-434 MHz range and the frequency of the transmitted signals can be adjusted from 300 to 310 MHz.

Figure 4:
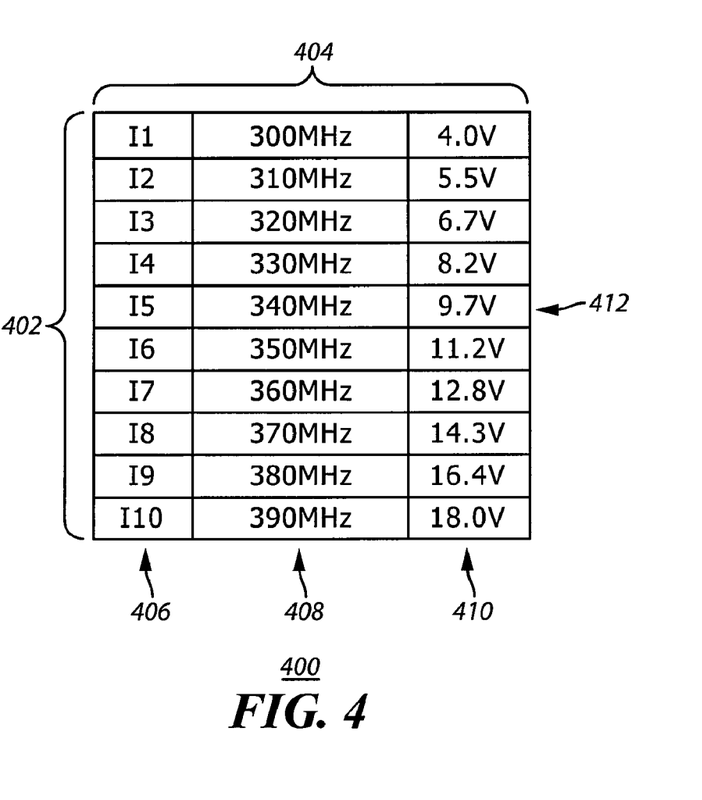
FIG. 4 comprises a lookup table utilizing for tuning an antenna according to various embodiments of the present invention.

Referring now to FIG. 4, one example of a lookup table 400 used in a universal transmitter according to the present approaches is described. The table 400 includes a series of rows 402 and columns 404.

Each row 402 may include an indictor value 406, desired frequency value 408, and an associated voltage value 410. The indicator value 406 is a data representation of a particular actuation of an actuator (e.g., the pressing of a particular button or the pressing of a button in a certain way). The voltage value 410 is the voltage desired to be applied to the varactor. Once the voltage value 410 is determined, the controller or processor transmits appropriate signals to a tuning circuit and/or synthesizer to adjust the value of the voltage across the varactor that produces the desired resonant center frequency for transmissions. Once the voltage is adjusted, the antenna is tuned to transmit at the appropriate frequency.

To take one example, if the user desires to transmit at 340 MHz, an actuator is actuated forming an indicator 15 associated with the desired frequency of 340 MHz. The table 400 is examined to find the indicator 15, and, in this example, an indicator 15 is found in row 412 that has a particular voltage value (in this case 9.7 volts). The processor or controller is operated so as to cause the voltage across the varactor to be 9.7 volts. This action causes the antenna to be tuned to have a resonant center frequency of approximately 340 MHz.

It will be appreciated that the lookup table of FIG. 4 is only one example of a data structure and that other examples of lookup tables having other types of information or other types of data structures are possible. It will also be appreciated that other circuit elements may be utilized instead of the varactor to tune the antenna to the frequency desired by the user.

Thus, universal transmitters are provided for use in conjunction with moveable barrier operator systems. The approaches provided herein utilize a single, tuned circuit that provides adequate Q-values so that transmissions can be made across an entire frequency spectrum at adequate power, for example, across the 300-434 MHz spectrum. Additionally, the transmitters that utilize these approaches are small, light weight, portable and can be powered by a conventional battery.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of transmitting signals at multiple frequencies from a transmitter, the method comprising:

determining by a processor circuit an operational center frequency of a signal to transmit according to received user input, the operational center frequency being centered within a first band of frequencies, the first band of frequencies having a first bandwidth;

tuning a single loop antenna to match the operational center frequency, the single loop antenna arranged and configured to operate across a second band of frequencies having a second bandwidth and wherein the first bandwidth is less than the second bandwidth, the tuning comprising:

a synthesizer circuit receiving a signal from the processing circuit, in response to receiving the signal from the processing circuit, the synthesizer circuit generating a transmission signal and applying the transmission signal to the single loop antenna for transmission, and the processor circuit and the synthesizer circuit applying signals to control application of a voltage to a tuner, the application of the voltage to the tuner effecting matching of the operational center frequency by the single loop antenna;

transmitting the signal to transmit from the single loop antenna according to the operational center frequency to provide a transmitted signal.

2. The method of claim 1 further comprising subsequently changing the operational center frequency to be a different value, the different value being within the second band of frequencies.

3. The method of claim 1 wherein tuning the single loop antenna comprises tuning the single loop antenna using a lookup table.

4. The method of claim 1 further comprising measuring a the voltage applied to the tuner with a feedback circuit in communication with the processor circuit and wherein tuning the single loop antenna comprises tuning the single loop antenna according to variations in the voltage applied to the tuner.

5. The method of claim 1 wherein the single loop antenna has an associated Q-value of greater than approximately 10.

6. The method of claim 1 wherein the first bandwidth is less than approximately 5 Mhz.

7. The method of claim 1 wherein the second bandwidth is from approximately 300 Mhz to approximately 434 Mhz.

8. A transmitter comprising:
a controller configured and arranged to determine a value of an operational center frequency of a signal to transmit according to received user input, the operational center frequency being centered within a first band of frequencies, the first band of frequencies having a first bandwidth;
a synthesizer circuit configured to receive an output from the controller based on the operational center frequency and to generate a transmission signal according to the received user input;
a single loop antenna configured to be driven by the transmission signal from the synthesizer circuit; and
a tuner coupled to the single loop antenna, the synthesizer circuit, and the controller, the tuner configured and arranged to receive signals from the synthesizer circuit and the controller to tune the single loop antenna to the operational center frequency determined by the controller.

9. The transmitter of claim 8 wherein the tuner comprises a varactor.

10. The transmitter of claim 9 wherein a voltage applied to the varactor is adjusted to change the value of the resonant center frequency.

11. The transmitter of claim 8 wherein the single loop antenna comprises a printed circuit board (PCB) antenna.

12. The transmitter of claim 8 wherein the tuner is configured and arranged to tune the single loop antenna according to a lookup table.

13. The transmitter of claim 8 further comprising a feedback circuit configured to measure a signals output by the single loop antenna by measuring a voltage applied to the tuner, the feedback circuit configured to signal to the controller information regarding the signals output by the single loop antenna, wherein the controller is configured to adjust control of the tuner based on the information regarding the signals output by the single loop antenna.

14. The transmitter of claim 8 wherein the single loop antenna has an associated Q-value of greater than approximately 10.

15. The transmitter of claim 8 wherein the first bandwidth is less than approximately 5 Mhz.

16. The transmitter of claim 8 wherein the second bandwidth is from approximately 300 Mhz to approximately 434 Mhz.

17. The method of claim 1 wherein determining an operational center frequency of a signal to transmit according to received user input comprises determining the operational center frequency of the signal to transmit in response to user input received at a user interface.

18. The transmitter of claim 8 further comprising a user interface configured to receive user input and operatively connected to the controller to provide the user input to the controller.

* * * * *

UNITED STATES PATENT AND TRADEMARK OFFICE
CERTIFICATE OF CORRECTION

| | | |
|---|---|---|
| PATENT NO. | : 8,055,219 B2 | Page 1 of 1 |
| APPLICATION NO. | : 11/969652 | |
| DATED | : November 8, 2011 | |
| INVENTOR(S) | : Jeremy E. Jenkins et al. | |

It is certified that error appears in the above-identified patent and that said Letters Patent is hereby corrected as shown below:

IN THE CLAIMS:

Column 9, Claim 4, Line 11: After "measuring" delete "a".

Signed and Sealed this
Sixth Day of March, 2012

David J. Kappos
*Director of the United States Patent and Trademark Office*